United States Patent

Andrews

[11] Patent Number: 5,911,121
[45] Date of Patent: Jun. 8, 1999

[54] METHOD AND APPARATUS FOR AUTOMATICALLY CONFIGURING A CONTROL PROGRAM FOR A MOBILE RADIO COMMUNICATION DEVICE

[75] Inventor: Craig A. Andrews, Raleigh, N.C.

[73] Assignee: Ericsson Inc., Research Triangle Park, N.C.

[21] Appl. No.: 08/652,374

[22] Filed: May 23, 1996

[51] Int. Cl.⁶ ........................................ H04B 1/38
[52] U.S. Cl. ................... 455/418; 455/550; 455/575
[58] Field of Search ........................... 455/418, 419, 455/420, 550, 552, 553, 575, 90, 186.1, 186.2; 379/354, 355, 357

[56] References Cited

U.S. PATENT DOCUMENTS

| 4,792,986 | 12/1988 | Garner et al. ........................ 455/418 |
| 5,077,832 | 12/1991 | Szczutkowski et al. . |
| 5,367,563 | 11/1994 | Sainton ................................ 455/418 |
| 5,414,753 | 5/1995 | Ehara ................................... 455/418 |
| 5,606,597 | 2/1997 | Newland .............................. 455/552 |

FOREIGN PATENT DOCUMENTS

| 0695071A2 | 7/1995 | European Pat. Off. . |
| 4029517A1 | 3/1992 | Germany . |

*Primary Examiner*—Thanh Cong Le
*Attorney, Agent, or Firm*—Rhodes, Coats & Bennett, L.L.P.

[57] ABSTRACT

A mobile telephone has a programmable controller for controlling the operation of the mobile telephone. The programmable controller has a plurality of selectable program configurations. An interchangeable component of the mobile telephone, such as the front cover of the housing, includes a program selector for indicating a selected program configuration. A detection circuit detects the program selector and generates a configuration signal representing the selected program configuration. The programmable controller is responsive to the configuration signal generated by the detection circuit to configure the control program according to the selected program configuration.

24 Claims, 7 Drawing Sheets

METHOD AND APPARATUS FOR AUTOMATICALLY CONFIGURING A CONTROL PROGRAM FOR A MOBILE RADIO COMMUNICATION DEVICE

FIELD OF THE INVENTION

The present invention relates generally to mobile radio communication systems, and more particularly, to a method and apparatus for automatically configuring a control program which controls the operation of a mobile radio communication device.

BACKGROUND OF THE INVENTION

The mobile telephone is one of the most popular forms of mobile radio communication devices. A mobile telephone typically comprises a handset including a speaker, a microphone, a keypad, and a display. A printed circuit board is contained within the handset which includes the transmit and receive circuits necessary for radio communication and audio processing circuits for coding and decoding voice communications. A control circuit including a programmable controller controls the operation of the mobile telephone according to a control program stored in memory.

Most mobile telephone manufacturers offer a variety of models with each model possessing different features and functions. For example, different model telephones may include different keypads and/or different displays. The differences between models are not necessarily limited to differences in the hardware configuration of the mobile telephone. A variety of software options are typically available for any given model telephone. Examples of typical software options include, without limitation, memory storage, speed dialing, automatic redialing, memory scrolling, call timing, etc.

The variety of hardware and software options available in different models complicates the manufacture of mobile telephones. Differences in hardware may require differences in the printed circuit board architecture as well as different programming to control their operation. Even if a common circuit board architecture can be used for all available models, each model still requires different programming. Changes in consumer demands sometimes necessitates reprogramming phones already in stock. Once a particular unit has been programmed, it is both time consuming and expensive to change the programming.

Accordingly, there is a need for a mobile telephone which shares a common circuit board architecture and which provides greater latitude in meeting consumer demands without the necessity of reprogramming phones.

SUMMARY OF THE INVENTION

The present invention relates to a mobile radio communication device used in a mobile radio communication system. The present invention uses a common printed circuit board architecture for a variety of different models of communication devices. The printed circuit board includes a programmable controller for controlling the operation of the communication device according to a control program stored in memory. The control program includes a plurality of program configurations which correspond to the available models. A program selector is mounted to an interchangeable component of the mobile radio communication device, such as the housing. The program selector includes one or more detectable selector elements representing a specific program configuration. A detection circuit on the printed circuit board is operatively coupled to the programmable controller for detecting the selector elements and for generating a configuration signal representing the selected program configuration. The programmable controller is responsive to the configuration signal from the detection circuit to configure the control program according to the selected program configuration.

The program selector allows the program configuration of the mobile radio communication device to be changed by simply interchanging a component, such as the front cover, of the device. This interchangability simplifies manufacturing and provides a greater degree of flexibility in inventory management. Manufacturing is simplified because only a single common circuit board architecture is needed for a plurality of different models. Inventory management is made more flexible because components can be interchanged easily without reprogramming phones to respond more quickly to changes in consumer demands.

DETAILED DESCRIPTION OF THE INVENTION

Referring now to the drawings, a preferred embodiment of the present invention will be described. It is understood, however, that the present invention can take on many different embodiments and is not intended to be limited to the embodiments described herein.

Figure 1:
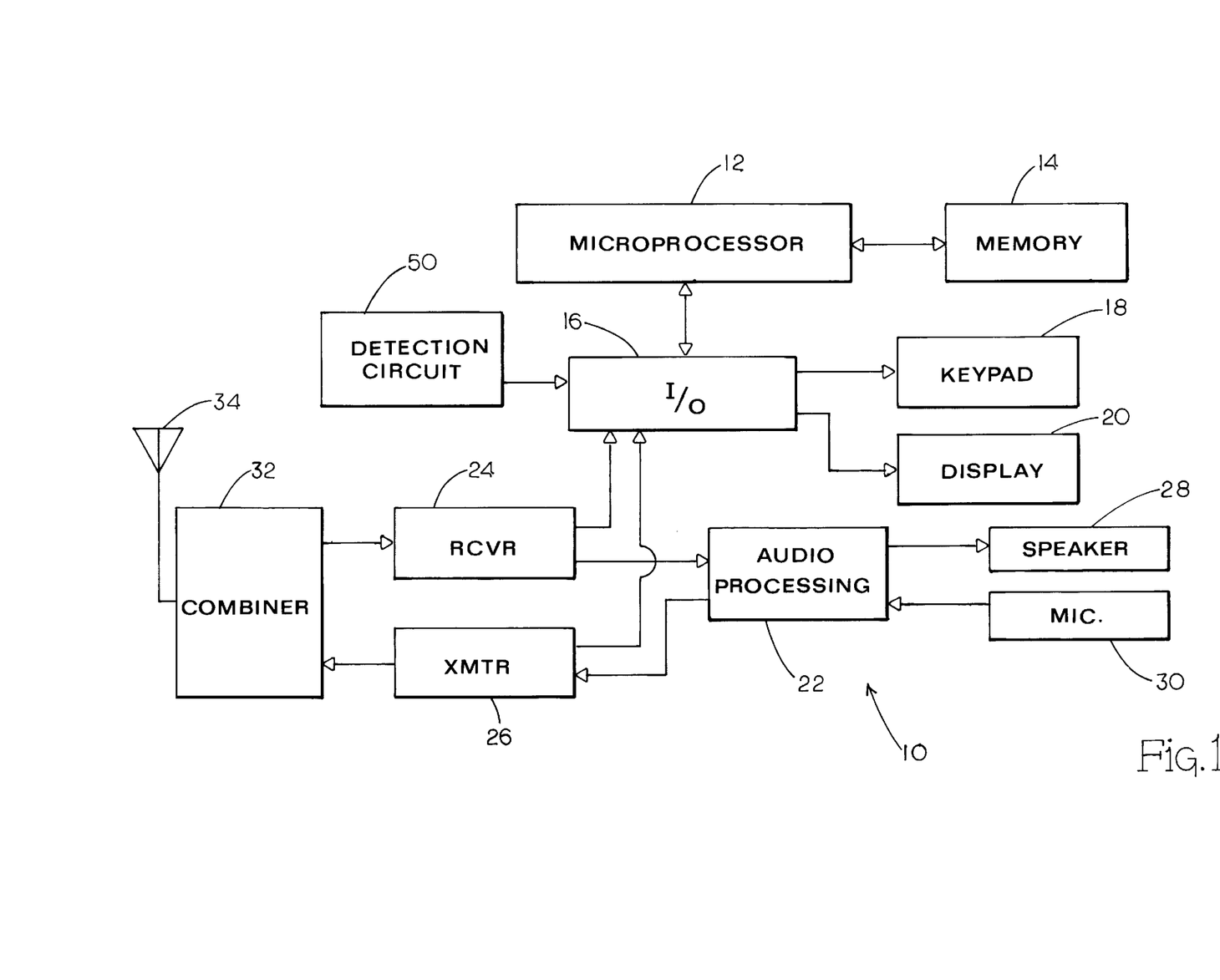
FIG. 1 is a block diagram illustrating the general architecture of a mobile telephone constructed in accordance with the present invention.

FIG. 1 illustrates in block diagram form the general architecture of a mobile telephone constructed in accordance with the present invention and which is indicated generally by the number 10. The mobile telephone 10 includes a microprocessor 12 for controlling the operation of the mobile telephone 10 and a program memory 14 for storing programs used by the mobile telephone 10. Input/output circuits 16 interface the microprocessor 12 with a keypad 18, a display 20, audio processing circuits 22, receiver 24, and transmitter 26. The audio processing circuits 22 provide basic analog audio outputs to the speaker 28 and accept analog audio inputs from the microphone 30. A conventional signal combiner 32 permits two-way, fully duplex communication over a common antenna 34.

Figures 2, 3:
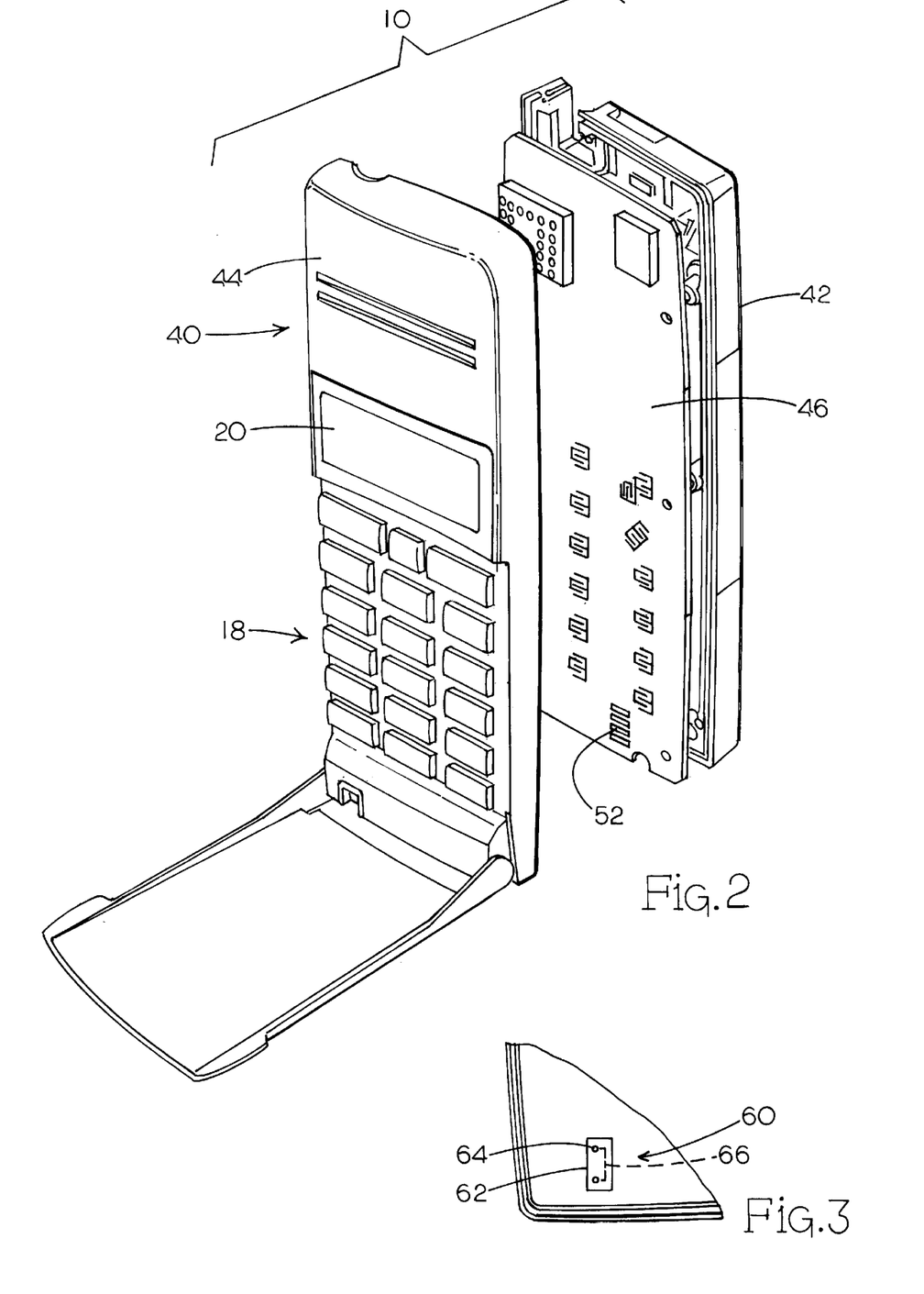
FIG. 2 is an exploded perspective view of the mobile telephone constructed in accordance with the present invention.
FIG. 3 is a view of the inside of the front cover of the mobile telephone showing the program selector.

Referring now to FIG. 2, there is shown an exploded perspective view of the mobile telephone 10. The mobile telephone 10 includes a housing 40 comprising a back cover 42 and a front cover 44. The front cover 44 of the mobile telephone 10 contains the keypad 18, display 20, speaker 28, microphone 30, and antenna connections. The back cover 42 typically includes battery connections for a battery pack (not shown). A printed circuit board 46 is contained within the housing 40. The printed circuit 46 board contains the microprocessor 12, program memory 14, input/output circuits 16, audio processing circuits 22, receiver 24, transmitter 26, and signal combiner 32.

Most mobile telephone manufacturers offer a variety of models with each model possessing different features or functions. For example, different model telephones may include different keypads 18 and/or displays 20. A variety of software options are also available with the more expensive models providing the greatest array of options.

To simplify the manufacture of a variety of different models, the mobile telephone 10 of the present invention employs a common printed circuit board architecture which is used in a plurality of models with interchangeable front covers 44 for each of the various models. The printed circuit board 46 contains all of the circuitry needed for each of the various models. Additionally, the program memory 14 stores a control program having a plurality of different program configurations corresponding to each available model. The front cover 44 includes a program selector 60 which is sensed by a detection circuit 50 on the printed circuit board 46. (See FIGS. 4 and 5.) The detection circuit 50 generates a configuration signal that tells the microprocessor 12 which of the available program configurations to use. Thus, the present invention provides a method and apparatus for automatically configuring the control program by simply interchanging front covers 44.

Referring now to FIG. 3, an exemplary embodiment of a program selector 60 is shown. The program selector 60 in the disclosed embodiment is in the form of a jumper which is attached to the inside of the front cover 44. The jumper includes a jumper block 62 preferably made of a resilient material having good insulating properties. In the disclosed embodiment, the jumper block 62 has pin holes for up to four jumper pins 64 which are electrically connected by a conducting member 66. Each model telephone employs a different arrangement of jumper pins 64. The number and location of the jumper pins 64 indicates a particular program configuration corresponding to that model.

Figure 4:
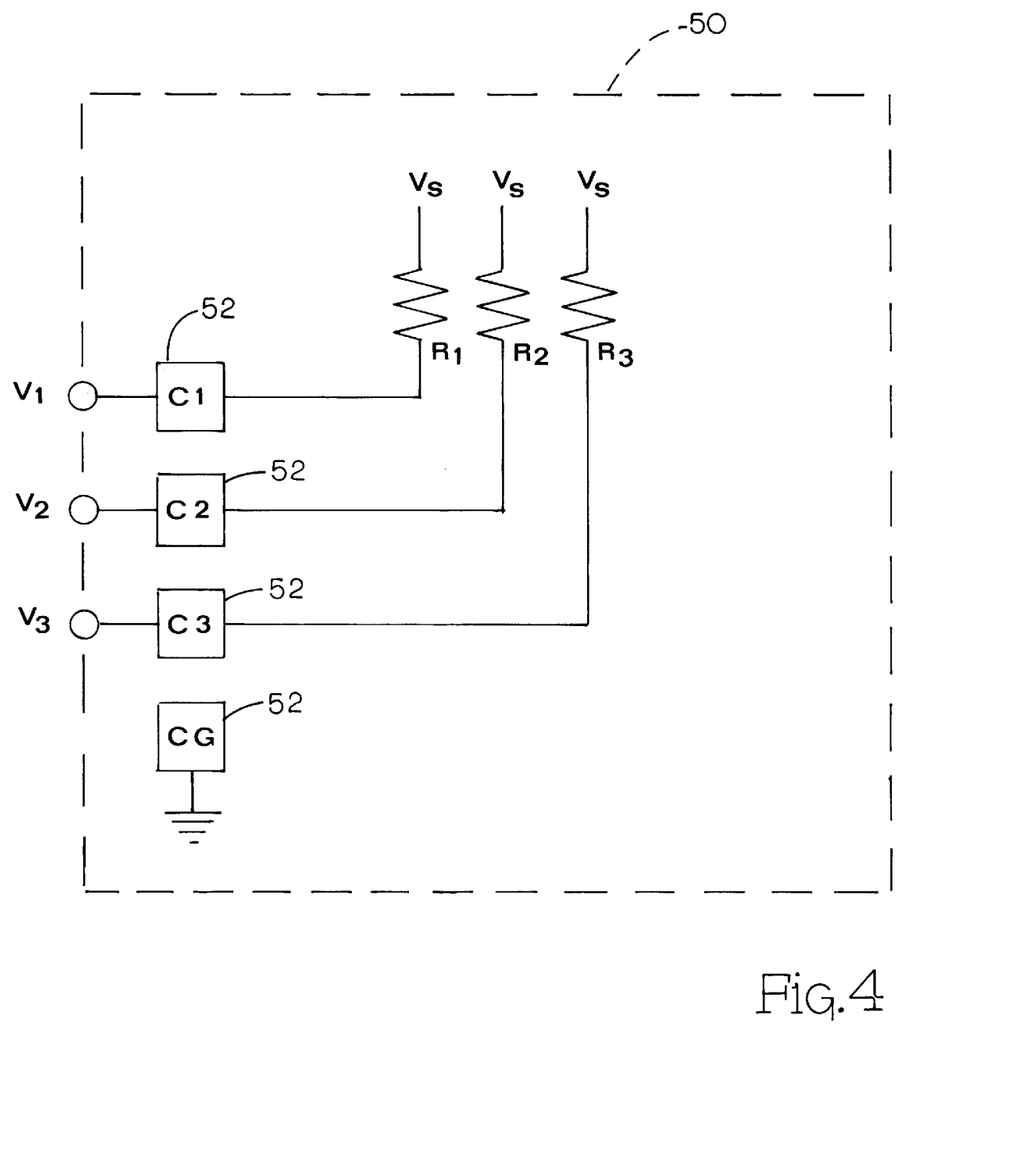
FIG. 4 is a schematic diagram illustrating one embodiment of the detection circuit used in the mobile telephone.

Referring now to FIG. 4, one embodiment of the detection circuit 50 is shown. The detection circuit 50 detects the jumper pins 64 on the jumper 60 and generates a configuration signal or signals representative of the selected program configuration which corresponds to a particular model mobile telephone 10. The detection circuit 50 includes a series of contacts 52 which are disposed on the surface of the printed circuit board 46 as shown in FIGS. 2. In the embodiment shown, there are a total of four contacts 52, which correspond to the four possible pin locations on the jumper 60. Three of the four contacts 52 (labeled C1–C3) are connected to a voltage supply $V_s$ through pull-up resistors $R_1$–$R_3$ and to a respective output $V_1$–$V_3$. The fourth contact 52 (labeled $C_G$) is connected to ground and is referred to as the ground contact. The pull-up resistors $R_1$–$R_3$ normally hold the respective outputs $V_1$–$V_3$ high. When the contacts C1–C3 are electrically connected to the ground contact $C_G$, the supply voltage is dropped across the pull-up resistors $R_1$–$R_3$ causing the outputs $V_1$–$V_3$ to go low. The outputs $V_1$–$V_3$ are supplied to the microprocessor 12 through the input/output circuit 16. The state of the outputs $V_1$–$V_3$ represents the selected program configuration. This configuration signal is used to configure the control program used by the microprocessor 12 to control the operation of the mobile telephone 10.

When the mobile telephone 10 is assembled, the jumper pins 64 on the jumper 60 engage respective contacts 52 on the printed circuit board. One of the jumper pins 64 engages the ground contact $C_G$ while the remaining jumper pins engage selected contacts $C_1$–$C_3$. The outputs $V_1$–$V_3$ of the contacts $C_1$–$C_3$ engaged by the jumper pins 64 goes to a low state while the non-engaged contacts remain in a high state. The number of possible output combinations is equal to $2^n$ where N is the total number of contacts excluding the ground contact. The 4-pin indicator illustrated allows up to 8 different output combinations which can be used to designate up to 8 different models.

Figure 5:
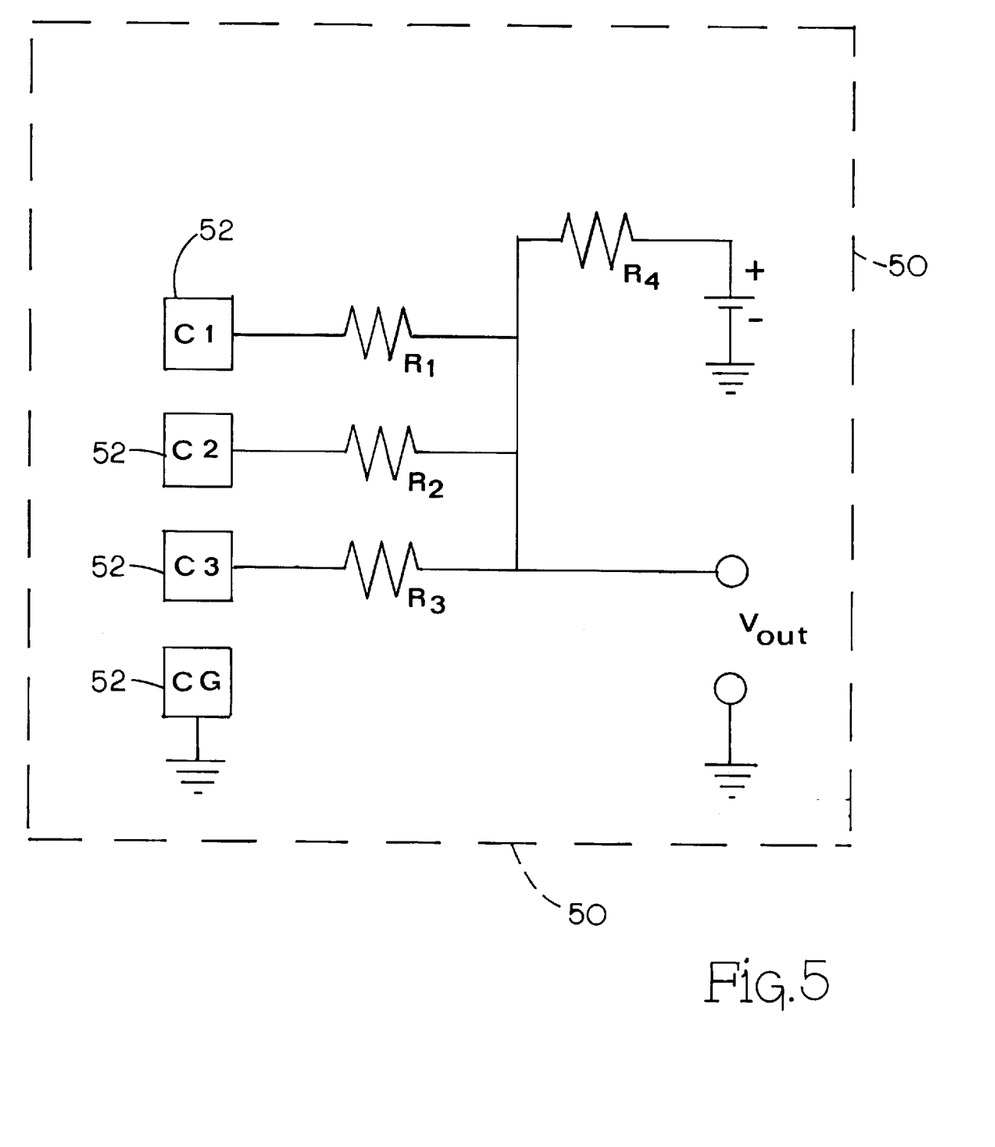
FIG. 5 is a schematic diagram illustrating an alternative embodiment of the detection circuit used in the mobile telephone.

Referring now to FIG. 5, there is shown an alternate embodiment of the detection circuit 50. The detection circuit 50 shown in FIG. 5 employs a serial scheme rather than a parallel scheme. The first three contacts $C_1$–$C_3$ are connected to a voltage supply $V_s$ through resistors $R_1$–$R_4$. Resistors $R_1$–$R_3$ are connected in parallel with one another and in series with resistor $R_4$. The detection circuit 50 shown in FIG. 5 generates a single output voltage $V_{out}$. The output voltage $V_{out}$ produced by the detector circuit 50 will vary depending upon which of the contacts $C_1$–$C_3$ are engaged by the jumper pins 64. Table 1 below shows the output voltage of the detection circuit 50 for each of the eight possible combinations. This assumes that the voltage supply is 4 volts and the resistor values are: $R_1$=500 Ω; $R_2$=1500 Ω; $R_3$=5000 Ω; and $R_4$=700 Ω. In Table 1, a "1" represents that the contact is engaged by a jumper pin 64.

TABLE 1

Output Voltages From Serial Detection Circuit

| Input | $C_1$ | $C_2$ | $C_3$ | Voltage $V_{out}$ |
|---|---|---|---|---|
| 0 | 0 | 0 | 0 | 4 |
| 1 | 0 | 0 | 1 | 3.509 |
| 2 | 0 | 1 | 0 | 2.727 |
| 3 | 0 | 1 | 1 | 2.49 |
| 4 | 1 | 0 | 0 | 1.667 |
| 5 | 1 | 0 | 1 | 1.575 |
| 6 | 1 | 1 | 0 | 1.395 |
| 7 | 1 | 1 | 1 | 1.33 |

The principal advantage of the serial detection circuit 50 shown in FIG. 5 is that it requires only one dedicated pin on the I/O chip whereas the parallel detection circuit shown in FIG. 4 would requires n dedicated pins for $2^n$ possible combinations. The serial detection circuit would, however, require analog to digital conversion to make the configuration signal readable by the microprocessor 12. Either the parallel detection circuit or the serial detection circuit could be used depending on the architecture of the mobile telephone 10.

While the disclosed embodiment employs a jumper which engages contacts on the printed circuit board 46, it will be readily apparent to those of ordinary skill in the art that many other detection schemes can be used. Broadly stated, the present invention employs some form of sensing means which is operatively connected to the microprocessor 12 for sensing a unique condition of an interchangeable component of the mobile telephone 10. The condition sensed may be, for example, some unique mechanical configuration of the housing 40 or other interchangeable component, magnetic field properties, optical properties, acoustical properties, or other electrical properties. The sensing means employed may comprise mechanical switches, optical sensors, sound transducers, or other type of sensor which is capable of generating an electrical signal. This list is not intended to be exhaustive but merely illustrative of the variety of different ways the present invention may be implemented.

To use the present invention, the printed circuit board 46 is designed to include all of the components and circuitry needed for each available model. For example, if different keypads 18 are used on different models, then the printed circuit board 46 must be designed to include circuitry for each different keypad 18. Similarly, if different models use different displays, then the printed circuit board 46 needs to include circuitry for driving each display 20. A control program to control each model telephone is written into the program memory 14. A portion of the program memory 14 is allocated to store configuration data for the control program for each different model. Table 2 below is an example of a look-up table showing configuration data for six different configurations corresponding to six different models. When power is supplied to the mobile telephone 10, the microprocessor 12 executes a configuration routine to configure its control program for the selected model telephone using the configuration data stored in the look-up table.

12. Alternately, the index table may include an address that points to a section of the program memory 14 containing the configuration data for the selected program configuration. The address can be used to set a pointer in the temporary memory that points to the configuration data rather than transfer the configuration data to the temporary memory. The latter alternative may be preferred because it utilizes less memory.

TABLE 3

Index Table

| Configuration Signal | Configuration | Configuration Value |
| --- | --- | --- |
| 001 | Model A Basic | 1 |
| 010 | Model B Basic | 2 |
| 011 | Model C Basic | 3 |
| 100 | Model A Plus | 4 |
| 101 | Model B Plus | 5 |
| 110 | Model C Plus | 6 |

Figures 6, 7:
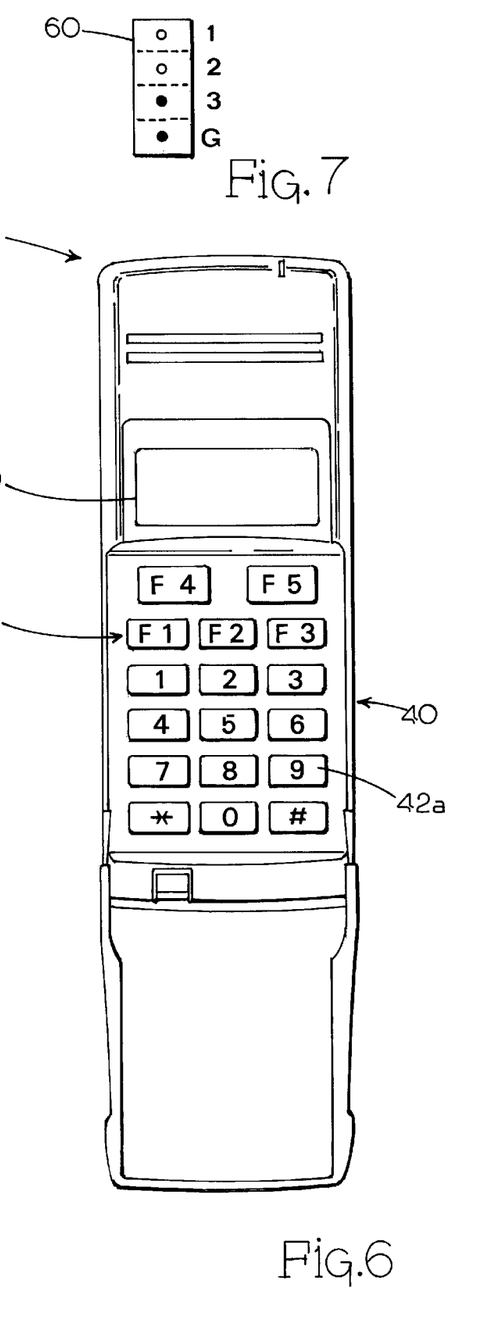
FIG. 6 is a front elevation illustrating the front cover of the mobile telephone corresponding to a first model.
FIG. 7 is a schematic representation of the jumper for the cover shown in FIG. 6.
Figures 8, 9:
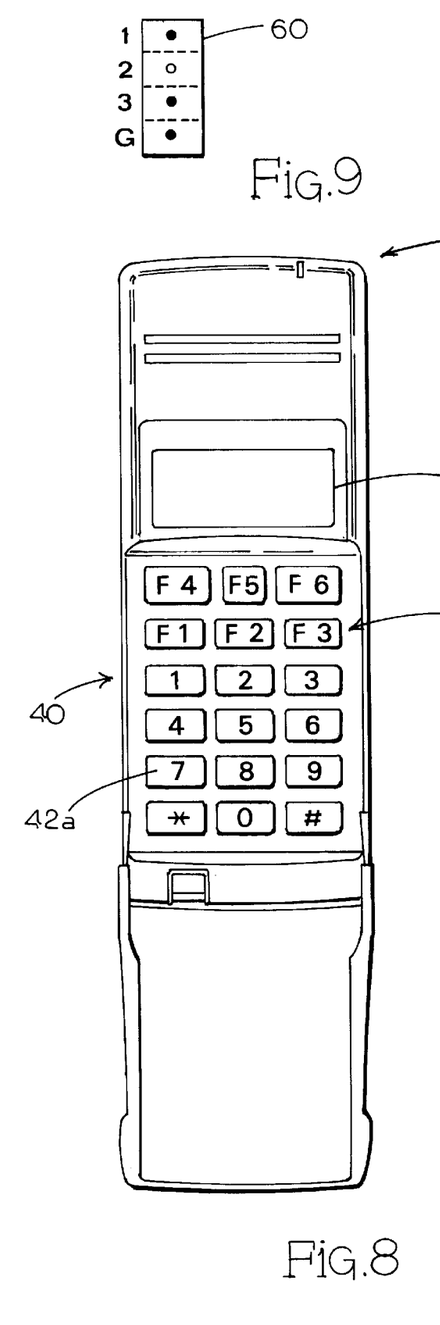
FIG. 8 is a front elevation illustrating another front cover for the mobile telephone corresponding to a second model.
FIG. 9 is a schematic representation of the jumper for the cover shown in FIG. 8.

FIGS. 6–10 illustrate the front covers 44 of two different models of mobile telephones 10. The telephone shown in FIG. 6 is a Model A Basic (See Table 3) which includes a five function keypad. FIG. 7 illustrates in schematic form the location of the jumper pins for a Model A Basic mobile telephone. As seen in FIG. 7, jumper pins 64 are present in both the ground position and the third position. FIG. 8 shows a Model B Plus phone having a six function keypad. FIG. 9 shows the jumper configuration for the Model B Plus phone. As seen in FIG. 9, the jumper 60 includes pins at the ground position and in the first and third positions.

TABLE 2

Configuration Look-up Table

| Configuration Value | Keypad Options | Acoustical Calibrations | Available Memory Locations | Alert Feature | User Scratchpad Availability | Last Dial Recall |
| --- | --- | --- | --- | --- | --- | --- |
| 1 | Map A | G = 20 | 30 | No | No | No |
| 2 | Map B | G = 21 | 30 | No | No | Yes |
| 3 | Map C | G = 18 | 30 | No | Yes | Yes |
| 4 | Map A | G = 20 | 75 | No | Yes | Yes |
| 5 | Map B | G = 21 | 90 | Yes | Yes | Yes |
| 6 | Map C | G = 18 | 106 | Yes | Yes | Yes |

Figure 11:
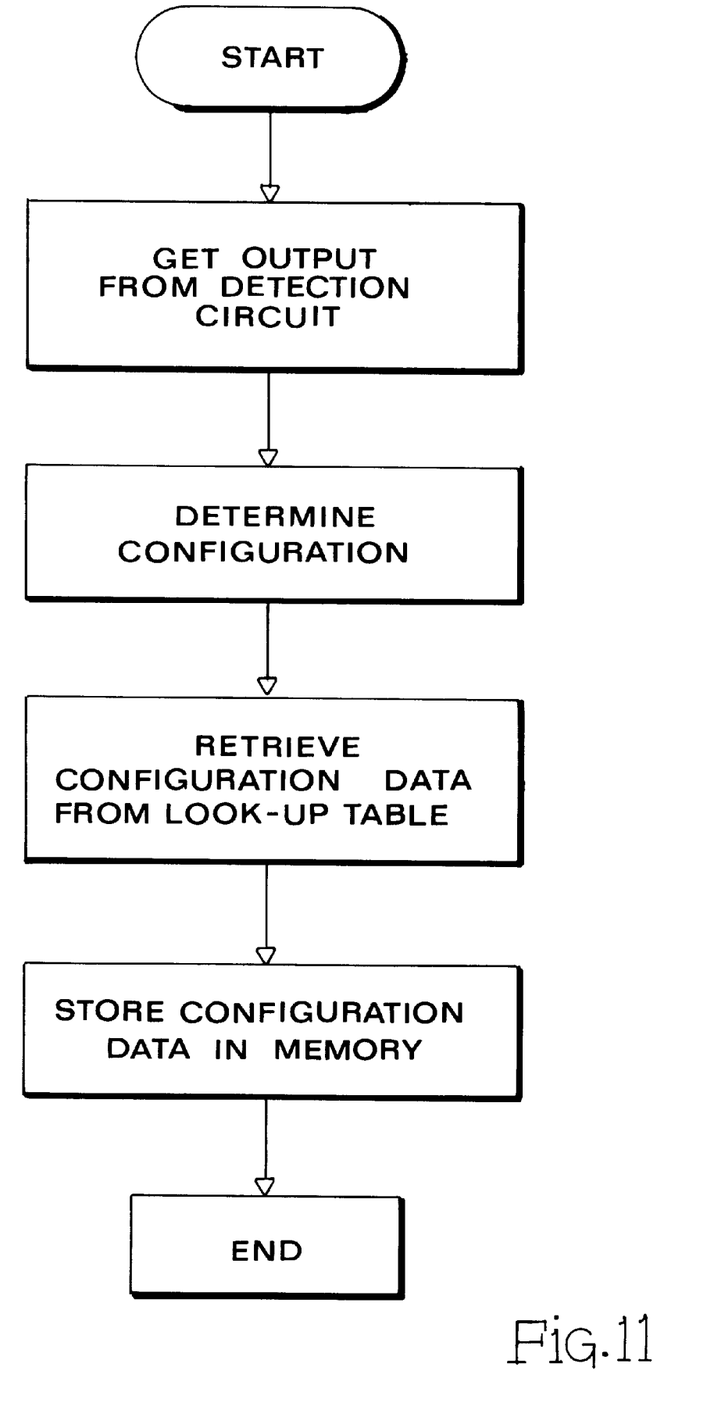
FIG. 11 is a flow diagram of an exemplary configuration routine used by the microprocessor.

FIG. 11 is a flow diagram illustrating an exemplary configuration routine executed by the microprocessor 12. This configuration routine is performed each time the mobile telephone 10 is turned on. The microprocessor 12 first "reads" the configuration signal from the detection circuit 50 and uses the configuration signal to determine the selected program configuration. The configuration can be determined, for example, by looking up a configuration value in an index table stored in the program memory 14. Table 3 is a representative example of an index table showing each available program configuration and a corresponding configuration value. The first column represents the configuration signal from the circuit shown in FIG. 4. Again, a "1" represent that the contact is engaged by a jumper pin 64 which will generate a logical low output.

Figure 10:
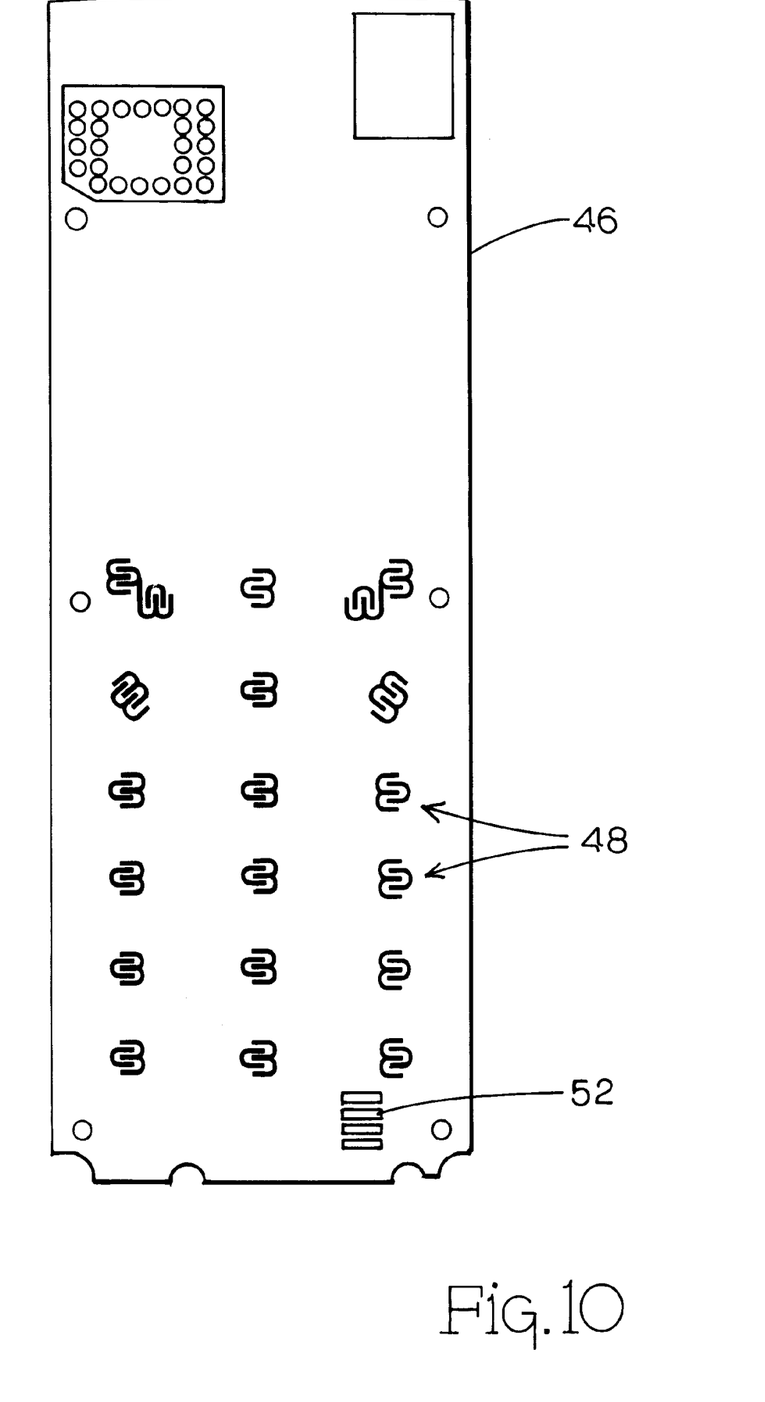
FIG. 10 is a top plan view of a printed circuit board used in the mobile telephone with the front covers shown in FIGS. 6–8.

After determining the configuration, the microprocessor 12 "looks up" the configuration data from the configuration table stored in the program memory 14 corresponding to the selected configuration. The configuration data is then stored in a temporary memory location, such as a random access memory (not shown) which is used by the microprocessor FIG. 10 shows a plan view of a printed circuit board 46 which may be used with either one of the front covers 42 shown in FIGS. 6 and 8. The printed circuit board 46 includes a plurality of key contacts 48. The key contacts 48 are arranged to work with either the six-function keypad shown in FIG. 6 or the five-function keypad shown in FIG. 7. Furthermore, the printed circuit board 46 includes four contacts 52 which align with the four pins on the jumper 60. When the front cover 44 is set in place, the jumper pins 64 engage respective contacts 52. The output of the detection circuit 50 will vary depending on which cover 44 is in place.

During initialization, the microprocessor 12 "reads" the configuration signal from the detection circuit 50 and "looks up" the configuration value in the index table. For the Model A Basic, the configuration value is 1. For the Model B Plus, the configuration value is 5. (See Table 3.) Using the configuration value, the microprocessor "looks-up" the configuration from the configuration table stored in the program memory 14. If the cover shown in FIG. 6 is used, the microprocessor 12 writes the following configuration data to the temporary memory:

Keypad option=Map A;

Acoustical calibration=20;

Available memory locations=30;

Alert feature=disabled;

User scratch pad=disabled; and

Last dial recall=disabled.

On the other hand, if the cover shown in FIG. 8 is used, the following configuration data is written to the temporary memory:

Keypad=Map B;

Acoustical calibration=21;

Available memory locations=90;

Alert feature=enabled;

User scratch pad=enabled; and

Last hour recall=enabled.

The configuration data is used by the microprocessor 12 to control the operation of the mobile telephone 10. The keypad option tells the microprocessor which keypad is in use so the appropriate map and key assignments can be used. The acoustical calibration is used to set programmable gain stages in the audio processing circuit 22 since the acoustic properties of the phone will vary slightly when the front covers 44 are interchanged. The available memory location tells the microprocessor 12 the number of addresses in its memory to allocate for storing telephone numbers. The alert feature, user scratch pad, and last dial recall are available software options which are either enabled or disabled.

Based on the foregoing, it is apparent that the present invention provides an easy and convenient method for automatically changing the configuration of the control program by simply interchanging the front covers 44 or other interchangeable components of the mobile telephone 10. The present invention allows the manufacturer more flexibility in maintaining inventory allowing the manufacturer to respond more quickly to fluctuations in demand.

The present invention may, of course, be carried out in other specific ways than those herein set forth without departing from the spirit and essential characteristics of the invention. For example, the particular dimensions used in describing the prototype of the convection oven built according to the present invention are not intended to limit the scope of the claims, but are provided only as examples. The present embodiments are, therefore, to be considered in all respects as illustrative and not restrictive, and all changes coming within the meaning and equivalency range of the appended claims are intended to be embraced therein.

What is claimed is:

1. A re-configurable mobile radio communication device comprising:
    a) a housing having an interchangeable component,
    b) a programmable controller contained in said housing for controlling the operation of said mobile radio communication device according to a configurable control program having a plurality of selectable program configurations;
    c) a program selector attached to said interchangeable component of said housing, said program selector including one or more selector elements for indicating a selected program configuration; and
    d) a detection circuit for detecting the selector elements when said component is attached to said device, and for generating a configuration signal indicative of the selected program configuration, said programmable controller being responsive to the configuration signal to automatically configure the control program according to the selected program configuration.

2. The mobile radio communication device according to claim 1 wherein said program selector comprises a jumper and wherein said selector elements comprise one or more electrically conductive jumper pins.

3. The mobile radio communication device according to claim 2 wherein said detection circuit includes one or more electrical contacts engaged by respective jumper pins on said jumper.

4. The mobile radio communication device according to claim 3 wherein selected contacts are connected to discrete outputs, said discrete outputs having a first state when said contact is engaged by a jumper pin and a second state when said contact is not engaged by a jumper pin.

5. The mobile radio communication device according to claim 3 wherein said detection circuit generates a variable analog output.

6. The mobile radio communication device according to claim 5 wherein said variable analog output is a voltage signal the magnitude of which is indicative of a selected program configuration.

7. A mobile radio communication device capable of automatic configuration comprising:
    a) a housing having a removable cover;
    b) a programmable controller for controlling the operation of said mobile radio communication device according to a configurable control program, said control program including a plurality of selectable program configurations;
    c) a memory device operatively coupled to said programmable controller for storing said control program;
    d) a program selector mounted to the cover of said housing, said program selector having one or more selector elements representative of a selected program configuration; and
    e) a detection circuit operatively coupled to said programmable controller for detecting the selector elements on said program selector elements when said housing is attached to said device, and for generating a configuration signal representing the selected program configuration, said programmable controller being responsive to said configuration signal from said detection circuit to automatically configure the control program according to the selected program configuration.

8. The mobile radio communication device according to claim 7 wherein said program selector comprises a jumper and wherein said selector elements comprise one or more electrically conductive jumper pins.

9. The mobile radio communication device according to claim 8 wherein said detection circuit includes one or more electrical contacts engaged by respective jumper pins on said jumper.

10. The mobile radio communication device according to claim 9 wherein selected contacts are connected to discrete outputs, said discrete outputs having a first state when said contact is engaged by a jumper pin and a second state when said contact is not engaged by a jumper pin.

11. The mobile radio communication device according to claim 9 wherein said detection circuit generates a variable analog output.

12. The mobile radio communication device according to claim 11 wherein said variable analog output is a voltage signal the magnitude of which is indicative of a selected program configuration.

13. A configurable controller for a mobile radio communication device comprising:

a) a housing having an interchangeable component;

b) program storage means for storing a control program which controls the operation of said mobile telephone, said control program including a plurality of selectable program configurations;

c) configuration data storage means for storing configuration data for said plurality of different program configurations;

d) selector means having an identifying characteristic attached to said interchangeable component for selecting one of said plurality of program configurations;

e) detecting means for detecting said identifying characteristic of said selector means which is indicative of a selected program configuration and for generating a configuration signal representing the selected program configuration; and f) a programmable controller for controlling the operation of said mobile radio communication device, said programmable controller being responsive to the configuration signal to automatically configure said control program without user input using configuration data corresponding to the selected program configuration.

14. The mobile radio communication device according to claim 13 wherein said detecting means comprises means for detecting a unique mechanical configuration of said interchangeable component.

15. The mobile radio communication device according to claim 14 wherein said detecting means comprises a detection circuit for detecting the presence of at least one electrically conductive selector element on said interchangeable component.

16. The mobile radio communication device according to claim 15 wherein the detection circuit includes one or more contacts engaged by said selector elements, said contacts being electrically connected to respective outputs, said outputs having a first state when said contact is engaged by a selector element and a second state when said contact is not engaged by a selector element.

17. The mobile radio communication device according to claim 15 wherein said detection circuit generates a variable analog output.

18. The mobile radio communication device according to claim 17 wherein said variable analog output is a voltage signal the magnitude of which is indicative of a selected program configuration.

19. A method for automatically configuring a control program for a mobile radio communication device having a plurality of program configurations comprising:

a) attaching a selector element to a removable housing component, wherein said selector element has a unique characteristic indicative of one of said program configurations, b) installing said housing component onto said mobile radio communication device;

c) detecting said selector element on said installed housing component;

d) generating a configuration signal representing the selected program configuration in response to the detection of said selector element;

e) inputting the configuration signal to a programmable controller; and f) configuring said control program by said programmable controller according to the selected program configuration.

20. The configuration method according to claim 19 wherein the step of detecting a unique condition of an interchangeable component comprises detecting a unique mechanical configuration of a housing component.

21. The configuration method according to claim 20 wherein the step of detecting a unique mechanical configuration of said housing component comprises detecting the presence of an electrically conductive selector element on the housing.

22. The configuration method according to claim 19 wherein the configuration signal generated is a digital signal.

23. The configuration method according to claim 19 wherein the configuration signal generated is an analog signal.

24. The configuration method according to claim 23 wherein the analog signal is a variable voltage signal.

* * * * *